United States Patent [19]

Brost

[11] Patent Number: 4,846,981

[45] Date of Patent: Jul. 11, 1989

[54] METHOD OF RESTORING PERMEABILITY AROUND WELLBORES

[75] Inventor: Dale F. Brost, Sugar Land, Tex.

[73] Assignee: Texaco Inc., White Plains, N.Y.

[21] Appl. No.: 286,117

[22] Filed: Dec. 19, 1988

[51] Int. Cl.[4] .................. C09K 3/00; E21B 43/16; E21B 43/25

[52] U.S. Cl. .................. 252/8.552; 166/273; 166/274; 166/275; 166/305.1; 166/311; 166/312; 252/8.553; 252/8.551

[58] Field of Search ............... 252/8.551, 8.552, 8.553, 252/8.513, 8.514, 136; 166/273, 274, 275, 305.1, 307, 311, 312; 134/3

[56] References Cited

U.S. PATENT DOCUMENTS

| | | | |
|---|---|---|---|
| 3,568,772 | 3/1971 | Gogarty et al. | 166/273 |
| 3,648,774 | 3/1972 | Kirk | 166/305.1 |
| 3,709,297 | 1/1973 | Christopher, Jr. et al. | 166/273 |
| 3,794,523 | 2/1974 | Thompson | 134/3 |
| 4,464,268 | 8/1984 | Schievelbein | 252/8.552 |
| 4,609,475 | 9/1986 | Hanlon et al. | 252/8.552 |
| 4,675,120 | 6/1987 | Martucci | 252/8.553 |
| 4,754,809 | 7/1988 | van Zanten et al. | 166/246 |

Primary Examiner—Howard J. Locker
Attorney, Agent, or Firm—Jack H. Park; Kenneth R. Priem; Harold J. Delhommer

[57] ABSTRACT

The invention is a method of restoring the permeability of an underground hydrocarbon formation adjacent to a wellbore which comprises injecting a first aqueous solution of hydrochloric or hydrofluoric acid into a formation interval where permeability has decreased due to polymer plugging and producing that acid out of the well after a soaking period. A second solution of about 200 ppm to about 2% by weight of chlorine dioxide is injected into the same interval and followed by a third solution of hydrochloric or hydrofluoric acid. The second and third solutions are allowed to soak in the formation for about 4 to about 48 hours before placing the well back on injection or production.

11 Claims, No Drawings

METHOD OF RESTORING PERMEABILITY AROUND WELLBORES

BACKGROUND OF THE INVENTION

This invention relates to a method of restoring the permeability of an underground hydrocarbon formation. More particularly, the invention concerns injecting multiple aqueous solutions of acid and chlorine dioxide to restore permeability to a formation interval near the wellbore where permeability has been reduced by polymer residue and biological material.

The use of surfactants and polymers in enhanced oil recovery techniques allows significant improvement in petroleum recovery. However, such systems can damage formation permeability due to plugging in the wellbore and formation. Even though enhanced oil recovery polymers are water soluble, polymer solutions may deposit polymer in the sand or rock formation adjacent the wellbore, reducing permeability of the formation. Other substances that cause formation plugging are naturally occurring animal and plant life such as algae which may grow and multiply around a wellbore.

A typical enhanced oil recovery process involves the injection of a polymer waterflood or aqueous drive polymer into an injection well and the recovery of petroleum and aqueous fluids from a production well. The aqueous drive fluid contains either biological or synthetic polymeric material and may drive a surfactant slug.

Biological polymeric materials are typically homopolysaccharides, xanthan gum heteropolysaccharides and adducts of these materials which may be used alone or in combination. These polymers are used in molecular weights ranging from about 500,000 to about 10,000,000 or more. Xanthan gum polysaccharides are typical water soluble drive fluid polymers. They may be contaminated with water insoluble, protein debris which will plug injection wells. The method of drive fluid make up can also augment well plugging.

Synthetic polymers include polyacrylamide, polymers containing acrylamide monomer, such as acrylamide-vinyl sulfonic acid copolymers and adducts thereof such as partially hydrolyzed acrylamide or alkoxylated acrylamide. Hydration of polyacrylamides prior to use requires extreme care, and if a polyacrylamide is not properly hydrated, it may plug the rock or sand matrix near the injection well. See U.S. Pat. Nos. 4,217,230; 4,228,016; 4,228,017 and 4,228,018. These polymers range in molecular weight from about 500,000 to about 10,000,000 or more.

Generally, polymer plugging occurs at or near the formation face in the wellbore. The porous formation face acts as a sieve to filter and accumulate insoluble and entrained matter from the aqueous drive fluid. As stated previously, this insoluble matter includes improperly hydrated polymer, protein debris and biological matter which may grow and multiply around the wellbore. After time, the accumulation becomes sufficient to substantially reduce the permeability of the formation to fluid.

Several treating agents have been proposed to alleviate permeability reduction problems. U.S. Pat. Nos. 3,482,636; 3,529,669 and 3,556,221 disclose sodium hypochlorite as a preferred treating agent. Because sodium hypochlorite must be used in alkaline solution, problems can occur with the formation of insoluble precipitates with calcium and magnesium salts. These may also plug formation pores. When such precipitation occurs, it is usually desirable to mix acid with the treating agent to dissolve the precipitate plug. But this is not possible with a sodium hypochlorite solution, because such a solution decomposes to chlorine gas and sodium salt upon acidification.

A method for restoring the permeability of injection wells which have become plugged with residue is described in U.S. Pat. No. 4,464,268. The patent discloses the injection of hydrogen peroxide in an aqueous solution in amounts of about 1% to about 30% by weight, and more preferably about 2% to about 10% by weight of hydrogen peroxide. The solution is allowed to soak in the formation for a period of time to attack and breakup the polymer and biological debris plugging the formation.

Chlorine dioxide is known in the art as an effective anticorrosion agent and a biocide in the oil field. For discussions of chlorine dioxide in corrosion controlled systems, see Canadian Pat. No. 1,207,260: Prues, W. et al., "Chemical Mitigation Of Corrosion By Chlorine Dioxide In Oil Field Waterfloods," Material Performance, Vol. 24, No. 5, pp. 45-50 (May 1985); and Sacco, F. J., "The Use Of Chlorine Dioxide In A Late Life Waterflood," American Chemical Society Petroleum Chemical Division Preprints, Vol. 29, No. 2, pp. 605-6 (March 1984), presented at the American Chemical Society Advances In Oil Field Chemicals and Chemistry Symposium at St. Louis, Apr. 8-13, 1984.

The use of chlorine dioxide as a biocide and a sulfide scavenger is discussed in a product information handout of NL Treating Chemicals entitled "DIKLOR-G Microbiocides/Sulfide Scavenger," Copyrighted April 1987; and Aieta, E. M. et al., "A Review Of Chlorine Dioxide In Drinking Water Treatment," Journal of AWWA, June 1986, p. 62-72.

ChemLink Petroleum Inc. has offered an injection service to oxidize and dissolve deposits that may restrict flow and water injection in disposal wells. This service is called "Easy-Stim" and is designed to remove contaminants such as biomass, iron sulfides, and various types of scale on tubing walls and in perforation slots. This is very briefly discussed in an undated handout entitled "Case History Easy-Stim". Although not mentioned in the handout, it is known that the Easy-Stim process involves the continuous coinjection of chlorine and chlorine dioxide in an overall concentration of 10,000 ppm with normal injection water into a well. The Easy-Stim injection lasts only for about 4 to 6 hours and involved no soaking period until recently in 1988. A soaking period of two hours is now offered.

SUMMARY OF THE INVENTION

The invention is a method of restoring the permeability of an underground hydrocarbon formation adjacent to a wellbore which comprises injecting a first aqueous solution of hydrochloric or hydrofluoric acid into a formation interval where permeability has decreased due to polymer plugging and producing that acid out of the well after a soaking period. A second solution of about 200 ppm to about 2% by weight of chlorine dioxide is injected into the same interval and followed by a third solution of hydrochloric or hydrofluoric acid. The second and third solutions are allowed to soak in the formation for about 4 to about 48 hours before placing the well back on injection or production.

DETAILED DESCRIPTION OF THE INVENTION

The injection and production of polymers for enhanced oil recovery often causes plugging of formations, lowering injectivity. This loss of permeability can be reversed by treating the plugged formation around the wells with a three stage injection of acid, chlorine dioxide, and acid, as described herein.

A first solution of about 100 to about 1000 barrels of hydrochloric or hydrofluoric acid is injected into a formation interval wherein permeability has decreased due to polymer plugging. This acid solution is allowed to soak for about 1 to about 10 hours before being produced from the well.

About 100 to 1000 barrels of a second aqueous solution comprising about 200 ppm to about 2% by weight, preferably about 500 ppm to about 5000 ppm, of chlorine dioxide is injected through a wellbore into the same formation interval where permeability has been decreased by polymer plugging.

The second solution of chlorine dioxide is immediately followed by the injection of a third solution of about 100 to about 1000 barrels of hydrochloric or hydrofluoric acid into the same formation interval. This third solution will displace the chlorine dioxide solution farther into the formation and provide needed protection against precipitate plugging.

The chlorine dioxide and hydrochloric or hydrofluoric acid slugs should then be allowed to soak in the formation for about 4 to about 48 hours, most preferably about 4 to 20 hours. Of course, depending on the plugging problems and the concentration of solutions employed, the soaking time may vary considerably. The injection or production well is then placed back on injection or production duty.

Hydrochloric acid is preferred and should be injected in a concentration of about 5% to about 30%, more preferably, about 10% to about 20%. Hydrofluoric acid should be injected in a concentration range of about 0.2% to about 4%. Optionally, the hydrochloric or hydrofluoric acid may also be coinjected with the chlorine dioxide.

Sufficient acid solution and chlorine dioxide solution must be injected to fill the damaged formation area around the wellbore with solution for a distance of about 1 foot to about 20 feet from the wellbore. Treating the porous formation for a distance of about 1 foot to about 5 feet is usually sufficient to attain good results.

Chlorine dioxide is a strong oxidant which degrades all forms of polymer present on the formation face. This includes gel particles resulting from imperfect mixing of emulsion polymers, cross-linked polymers applied for injection profile modification, and polymers excreted by microorganisms. Chlorine dioxide also degrades oil-coated iron sulfide, another common plugging agent by passing through oil layers and water wetting particles. Removal of these plugging agents both increases water injectivity directly, and improves the ability of subsequent acid injectants to contact and dissolve iron sulfide and formation materials.

Injecting chlorine dioxide in an acidic environment increases the effectiveness of the treatment significantly. Since chlorine dioxide breaks down to chlorine in an acid pH, the oxidative power of chlorine dioxide is higher at low pH.

The injection of hydrochloric or hydrofluoric acid solutions before and after chlorine dioxide is necessary to not only optimize polymer oxidation, but is required to prevent the precipitation of iron(III) hydroxide, which occurs at pH above 2. The third solution of acid provides additional insurance against increases in pH in the formation face.

It has been discovered that it is even more effective to supplement the invention method with a staged acid treatment of acid on the formation after returning an injection well to injection duty. This may be done with multiple slugs of hydrochloric acid, preferably 3 or 4 slugs separated by salt blocks.

The following examples will further illustrate the novel method of restoring permeability by the step injection of acid and chlorine dioxide. These examples are given by way of illustration and not as limitations on the scope of the invention. Thus, it should be understood that the method be varied to achieve similar results within the scope of the invention.

EXAMPLES 1-2

The invention steps of acid, chlorine dioxide, and acid injection were performed on waterflood injection wells in West Texas. Both wells had experienced substantial permeability and injection declines due to polyacrylamide waterflooding.

The workover procedure listed in Table 1 was employed on both wells. Acidic solutions before and after chlorine dioxide injection were necessary to optimize the rat and extent of polymer and iron sulfide oxidation. Acidity was also desired to prevent the precipitation of iron(III) hydroxide, which occurs at pH above 2. Prevention of iron(III) hydroxide precipitation required that chlorine dioxide injectant be followed directly by 500 barrels of hydrochloric acid. The acid slug provided additional insurance against increases in pH in the formation face until the workover fluids were pushed far away from the wellbore. Although an option of the invention method, the chlorine dioxide and hydrochloric acid slugs were not backflowed after soaking in order to maximize he oxidation yield as any residual chemical flowed out into the formation.

TABLE 1

INJECTION WELL WORKOVER PROCEDURE FOR EXAMPLES 1-2

1. Well backflowed until returned fluid was clear.
2. Tubing and packer were pulled.
3. Drill bit and casing scraper were run to remove excess debris from wellbore.
4. Well backflowed until returned fluid was clear.
5. Tubing and packer was reset.
6. 500 gallons of 15% NEFE HCl were injected. The injected fluid was displaced to the top perforation and allowed to soak for 4 hours.
7. The entire injection load was backflowed until the water was clear.
8. 250 bbls of water containing 2000 ppm chlorine dioxide was injected into the formation.
9. Immediately following the chlorine dioxide solution, 500 gallons of 15% NEFE HCl was injected and displaced to the bottom perforation. The well was shut in overnight.
10. Well was returned to injection.
11. Injection rate and pressure was monitored until well stabilized.
12. A staged acid treatment was performed using 15% NEFE HCl slugs separated by salt blocks.
    Example 1 Well received 2000 gallons HCl in 3 stages.
    Example 2 Well received 6500 gallons HCl in 4 stages.
13. Well was returned to injection.
14. Injection rate and pressure was monitored until the well stabilized.

The injection pressure for the Example 1 Well remained between 2800 psig and 2900 psig throughout the acid/chlorine dioxide/acid workover. Injectivity which was initially reduced to 730 barrels of fluid per day, doubled to 1350 barrels of fluid per day after treatment, and increased further to 1560 barrels of fluid per day after the staged acid treatment.

For the Example 2 Well, the changed permeability had reduced injectivity to 1200 barrels of fluid per day. Injectivity doubled to 2370 barrels of fluid per day after acid/chlorine dioxide/acid treatment, and further increased to 3020 barrels per day after the staged acid treatment. Injection pressure remained at 2800 psig, the same as before treatment was begun.

The invention workover treatment restored permeability substantially better than previous hydrogen peroxide/acid workovers applied to wells in the same lease as Examples 1 and 2 over the past several years. Furthermore, the cost of injected chlorine dioxide was about one third the cost of the hydrogen peroxide previously used in the neighboring wells according to the method of U.S. Pat. No. 4,464,268. The invention method reduced total workover expense by several thousand dollars per well, and was significantly more effective in attacking polymer plugging and restoring permeability.

Many other variations and modifications may be made in the concepts described above by those skilled in the art without departing from the concepts of the present invention. Accordingly, it should be clearly understood that the concepts disclosed in the description are illustrative only and are not intended as limitations on the scope of the invention.

What is claimed is:

1. A method of restoring polymer decreased permeability of an underground hydrocarbon formation adjacent to a wellbore, which comprises:
    injecting a first solution of about 100 barrels to about 1000 barrels of hydrochloric or hydrofluoric acid through a wellbore into a formation interval wherein permeability has decreased due to polymer plugging;
    allowing the hydrochloric or hydrofluoric acid to soak in the formation for about 1 to about 10 hours;
    producing the hydrochloric or hydrofluoric acid solution from the well;
    injecting through the wellbore about 100 to about 1000 barrels of a second aqueous solution comprising about 200 ppm to about 2% by weight of chlorine dioxide into said formation interval wherein permeability has decreased due to polymer plugging;
    injecting through the wellbore a third solution of about 100 barrels to about 1000 barrels of hydrochloric or hydrofluoric acid to displace the chlorine dioxide farther into the formation interval; and
    allowing the chlorine dioxide and hydrochloric or hydrofluoric acid to soak in the formation interval for about 4 to about 48 hours.

2. The method of claim 1, wherein the chlorine dioxide solution has a concentration of about 500 ppm to about 5000 ppm of chlorine dioxide.

3. The method of claim 1, wherein sufficient chlorine dioxide solution is injected to fill the formation interval with solution for a distance of about 1 foot to about 20 feet from the wellbore.

4. The method of claim 1, wherein the solution is injected into a formation interval around an injection well.

5. The method of claim 4, further comprising returning the injection well to injection after allowing the chlorine dioxide and acid to soak in the formation.

6. The method of claim 5, further comprising performing a staged acid treatment on the formation interval after returning the well to injection using hydrochloric acid slugs separated by salt blocks.

7. The method of claim 1, wherein the solution is injected into a formation interval around a production well.

8. The method of claim 1, further comprising coinjecting acid into the formation with the chlorine dioxide.

9. The method of claim 1, wherein hydrochloric acid is injected in a concentration of about 5% to about 30%.

10. The method of claim 1, wherein the second and third solutions of chlorine dioxide and hydrochloric or hydrofluoric acid are allowed to soak in the formation for about 4 to about 20 hours.

11. A method of restoring polymer decreased permeability of an underground hydrocarbon formation adjacent to an injection well, which comprises:
    injecting a first solution of about 100 barrels to about 1000 barrels of about 5% to about 30% hydrochloric acid through an injection well into a formation interval wherein permeability has decreased due to polymer plugging;
    allowing the hydrochloric acid to soak in the formation for about 1 to about 10 hours;
    producing the hydrochloric acid solution from the injection well;
    injecting through the injection well about 100 to about 1000 barrels of a second aqueous solution comprising about 500 ppm to about 5000 ppm by weight of chlorine dioxide into said formation interval wherein permeability has decreased due to polymer plugging;
    injecting through the injection well a third solution of about 100 barrels to about 100 barrels of about 10% to about 25% hydrochloric acid to displace the chlorine dioxide farther into the formation interval;
    allowing the chlorine dioxide and hydrochloric acid to soak in the formation interval for about 4 to about 20 hours; and
    returning the injection well back to injection duty.

* * * * *

UNITED STATES PATENT AND TRADEMARK OFFICE
CERTIFICATE OF CORRECTION

PATENT NO. : 4,846,981

DATED : July 11, 1989

INVENTOR(S) : Dale Francis Brost

It is certified that error appears in the above-identified patent and that said Letters Patent is hereby corrected as shown below:

Claim 11, Col. 6, Line 52 delete the second occurrence of "100" and substitute therefor --1000--.

Signed and Sealed this

Eighth Day of May, 1990

*Attest:*

HARRY F. MANBECK, JR.

*Attesting Officer*      *Commissioner of Patents and Trademarks*